(12) United States Patent
Rantanen et al.

(10) Patent No.: US 9,002,321 B2
(45) Date of Patent: Apr. 7, 2015

(54) METHODS, APPARATUSES, SYSTEM, RELATED COMPUTER PROGRAM PRODUCT AND DATA STRUCTURES FOR INFORMING OF ROAMING RESTRICTIONS

(75) Inventors: Tommi Rantanen, Tampere (FI); Dirk Kroselberg, Munich (DE); Achim Von Brandt, Munich (DE); Domagoj Premec, Zagreb (HR)

(73) Assignee: Nokia Corporation, Espoo (FI)

( * ) Notice: Subject to any disclaimer, the term of this patent is extended or adjusted under 35 U.S.C. 154(b) by 726 days.

(21) Appl. No.: 13/127,151

(22) PCT Filed: Oct. 30, 2008

(86) PCT No.: PCT/IB2008/054528
§ 371 (c)(1),
(2), (4) Date: Jul. 29, 2011

(87) PCT Pub. No.: WO2010/049757
PCT Pub. Date: May 6, 2010

(65) Prior Publication Data
US 2012/0100831 A1 Apr. 26, 2012

(51) Int. Cl.
H04W 48/08 (2009.01)
H04L 29/06 (2006.01)
H04W 12/06 (2009.01)
H04W 8/12 (2009.01)

(52) U.S. Cl.
CPC ............ *H04W 48/08* (2013.01); *H04L 63/162* (2013.01); *H04W 12/06* (2013.01); *H04W 8/12* (2013.01)

(58) Field of Classification Search
None
See application file for complete search history.

(56) References Cited

U.S. PATENT DOCUMENTS

| 7,082,114 B1 | 7/2006 | Engwer et al. |
| 2006/0198347 A1 | 9/2006 | Hurtta et al. |
| 2006/0268802 A1 | 11/2006 | Faccin |
| 2008/0253332 A1 | 10/2008 | Ore et al. |

FOREIGN PATENT DOCUMENTS

| CA | 2306895 A1 | 4/1999 |
| EP | 0962114 A1 | 12/1999 |

(Continued)

OTHER PUBLICATIONS

International Search Report received for corresponding Patent Cooperation Treaty Application No. PCT/IN2008/054528, dated Jul. 8, 2009, 4 pages.

(Continued)

*Primary Examiner* — Kashif Siddiqui
(74) *Attorney, Agent, or Firm* — Mintz Levin Cohn Ferris Glovsky and Popeo, P.C.

(57) ABSTRACT

It is disclosed a method (and related apparatus) comprising transmitting, after a network entry authentication procedure, between an access network gateway entity and one of a terminal and a serving entity, generated terminal mobility restriction information in the form of at least one text information element comprised in an authentication notification message, and receiving the terminal mobility restriction information; and a method (and related apparatus) comprising transmitting, via network entity management procedures, terminal mobility restriction information in the form of at least one additional leaf node being added to a network entity management object, and receiving the terminal mobility restriction information.

6 Claims, 7 Drawing Sheets

(56) References Cited

FOREIGN PATENT DOCUMENTS

GB      2443233         4/2008
WO      98/37722  A1    8/1998

OTHER PUBLICATIONS

Written Opinion received for corresponding Patent Cooperation Treaty Application No. PCT/IN2008/054528, dated Jul. 8, 2009, 8 pages.

International Preliminary Report on Patentability received for corresponding Patent Cooperation Treaty Application No. PCT/IN2008/054528, dated May 8, 2011, 9 pages.

Office Action received for corresponding Chinese Application No. 200880131764.7, dated Jun. 20, 2013, 8 pages.

Office Action received for corresponding Korean Application No. 2011-7012385, dated Jul. 23, 2012, 9 pages.

Office Action received for corresponding Korean Application No. 2011-7012385, dated Jan. 24, 2013, 4 pages.

"WiMAX Forum Network Architecture", WIMAX Interworking with DSL, Stage 2-3, Release 1.1.2, Nov. 8, 2007, 900 pages.

Fig. 6

Mobility Restriction information

| Type | Tbd | | |
|---|---|---|---|
| Length in octets | Variable | | |
| Description | Information about network mobility restrictions applying to the SS: | | |
| Elements (Sub-TLVs) | TLV Name | Description | |
| | Restriction type | 0 for fixed, 1 for nomadic | |
| | Allowed-BS whitelist | List of BS identifiers that are allowed for the SS and subscriber | |
| | Allowed-Location | Latitude/longitude/Radius, Country/Time Zone or other appropriate location restriction data | |
| | Other related information | As required | |

Fig. 7

| Status | Tree Occurrence | Format | Min. Access Types |
|---|---|---|---|
| OPTIONAL | ZeroOrOne | Int | Get, Replace |

| Value | Description |
|---|---|
| 0 | Reserved |
| 1 | Mobile (default) |
| 2 | Fixed |
| 3 | Nomadic |
| 4-255 | Reserved |

WiMAXSupp / Operator / <X> / SubscriptionParameters /Primary /MobilityRestriction

WiMAXSupp / Operator / <X> / SubscriptionParameters / OtherSubscription / <X> / MobilityRestriction

WiMAXSupp/Operator/<X>/NetworkParameters/CAPL/Entries/<X>/MobilityRestriction
WiMAXSupp/Operator/<X>/NetworkParameters/RAPL/Entries/<X>/MobilityRestriction

WiMAXSupp/Operator/<X>/SubscriptionParameters/Primary/MobilityRestrictions/<X>/Restriction
WiMAXSupp/Operator/<X>/SubscriptionParameters/Primary/MobilityRestrictions/<X>/NAPList
WiMAXSupp/Operator/<X>/SubscriptionParameters/Primary/MobilityRestrictions/<X>/NAPList/<X>
WiMAXSupp/Operator/<X>/SubscriptionParameters/Primary/MobilityRestrictions/<X>/NAPList/<X>/NAP
WiMAXSupp/Operator/<X>/SubscriptionParameters/Primary/MobilityRestrictions/<X>/V-NSPList
WiMAXSupp/Operator/<X>/SubscriptionParameters/Primary/MobilityRestrictions/<X>/V-NSPList/<X>
WiMAXSupp/Operator/<X>/SubscriptionParameters/Primary/MobilityRestrictions/<X>/V-NSPList/<X>/V-NSP
WiMAXSupp/Operator/<X>/SubscriptionParameters/Primary/MobilityRestrictions/<X>/BSList
WiMAXSupp/Operator/<X>/SubscriptionParameters/Primary/MobilityRestrictions/<X>/BSList/<X>
WiMAXSupp/Operator/<X>/SubscriptionParameters/Primary/MobilityRestrictions/<X>/BSList/<X>/BS

METHODS, APPARATUSES, SYSTEM, RELATED COMPUTER PROGRAM PRODUCT AND DATA STRUCTURES FOR INFORMING OF ROAMING RESTRICTIONS

RELATED APPLICATION

This application was originally filed as PCT Application No. PCT/IB2008/054528 filed Oct. 30, 2008.

FIELD OF THE INVENTION

Examples of the present invention relate to informing of roaming restrictions. More specifically, the examples of the present invention relate to methods, apparatuses, a system, a related computer program product and data structures for informing of roaming restrictions. Examples of the present invention may be applicable to broadband wired and wireless access networks. These may include worldwide interoperability for microwave access (WiMAX) networks e.g. according to the specifications of the institute of electrical and electronics engineers (IEEE) 802.16 group.

BACKGROUND

IP based mobile networks are, for example, WiMAX networks. WiMAX Networks are defined by the WiMAX Forum and are e.g. based on the IEEE 802.16 standards, as mentioned above. The Network Working Group (NWG) of the WiMAX Forum prescribes in their draft specification, among other issues, the network architecture 100 for WiMAX networks as shown in FIG. 1.

According to FIG. 1, each subscriber station (SS) or mobile subscriber station (MS) (also referred to as a terminal hereinafter) is connected, via reference point R1, with an access service network (ASN) being provisioned by a network access provider (NAP). ASNs are divided into a subset of base stations (BS) and a so-called ASN gateway (ASN-GW). The air interface between a SS/MS and a BS may be defined e.g. in the above-referenced IEEE standards.

Via reference point R3, an ASN is connected e.g. with a connectivity service network (CSN) being provisioned by a network service provider (NSP). CSNs support ASNs concerning authentication of SS/MSs, supply the same with IP addresses and provide access to IP-based networks such as the Internet. Since the CSN, to which an MS is connected to via an ASN, is not necessarily the home CSN of the MS, two CSNs may be connected with each other via reference point R5.

There have been approaches directed to WiMAX.

The existing solutions that are available from WiMAX Forum NWG work do not provide any means to inform a WiMAX device (e.g. SS) of the fact that the network is capable of implementing mobility restrictions like only allowing fixed access or nomadic access.

Furthermore, there is no method or procedure available of how to inform a SS or subscriber about the fact that mobility restrictions apply to a specific network, or about further detailed information related to the mobility restrictions applying to the whole network, or to individual SS or subscribers.

In consideration of the above, according to examples of the present invention, methods, apparatuses, a system, a related computer program product and data structures for informing roaming restrictions are provided.

According to an example of the present invention, in a first aspect, this object is for example achieved by a method comprising:

transmitting, after a network entry authentication procedure, between an access network gateway entity and one of a terminal and a serving entity, generated terminal mobility restriction information in the form of at least one text information element comprised in an authentication notification message.

According to further refinements of the example of the present invention as defined under the above first aspect, the method further comprises generating the authentication notification message comprising the terminal mobility restriction information in the form of the at least one text information element.

According to an example of the present invention, in a second aspect, this object is for example achieved by a method comprising:

receiving, after a network entry authentication procedure, between an access network gateway entity and one of a terminal and a serving entity, terminal mobility restriction information in the form of at least one text information element comprised in an authentication notification message.

According to further refinements of the example of the present invention as defined under the above first and second aspects, if the transmitting or receiving is performed between the access network gateway entity and the serving entity, at least one of the following applies: the serving entity is situated in one of a home connectivity service network and a local visited connectivity service network, the authentication notification message is carried by one of a remote authentication dial-in user service request and a diameter request, both relating to an access, authorization, and accounting protocol, and the authentication notification message is carried across an R3 interface between the access network gateway entity and the serving entity;

the at least one text information element is constituted by a type-length-value information element;

the at least one type-length-value information element comprises sub information elements relating to at least one of a restriction type, a list of allowed base stations, a list of prohibited base stations, and an allowed location of the terminal;

the authentication notification message is constituted by a extensible authentication protocol notification request message.

According to an example of the present invention, in a third aspect, this object is for example achieved by a method comprising:

transmitting, via network entity management procedures, terminal mobility restriction information in the form of at least one additional leaf node being added to a network entity management object.

According to further refinements of the example of the present invention as defined under the above third aspect, the method further comprises adding the at least one additional leaf node to the network entity management object.

According to an example of the present invention, in a fourth aspect, this object is for example achieved by a method comprising:

receiving, via network entity management procedures, terminal mobility restriction information in the form of at least one additional leaf node being added to a network entity management object.

According to further refinements of the example of the present invention as defined under the above third and fourth aspects, the additional leaf node is added to a primary subscriber parameters leaf node of the management object;

the additional leaf node comprises at least one of a status field, a tree occurrence field, a format field and an access type field;

the additional leaf node represents a value indicating one of a mobile restriction, a fixed restriction and a nomadic restriction;

the additional leaf node is added under both a current subscription node and other subscriptions node in the network;

the network entity management object is constituted by a worldwide interoperability for microwave access supplementary management object;

the additional leaf node is further added to at least one of a contractual agreement preference list leaf node and a roaming agreement preference list leaf node;

a second additional leaf node is further added to the additional leaf node of the management object;

the second additional leaf node comprises a mobility restriction and at least one list indicating elements where the mobility restriction is to be applied, the elements being at least one of network access providers, visited network service providers, and base stations;

the network entity management procedures are based on one of an open mobile alliance device management protocol and a technical report 069 protocol;

the method further comprises judging whether an accuracy of the terminal mobility restriction information is insufficient or not, and, if the accuracy is judged to be insufficient, transmitting or receiving, prior to another network entry authentication procedure, second terminal mobility restriction information in the form of one text information element of a fixed length in one of a downlink channel descriptor message, a ranging response message, a terminal basic capability response message or a registration response message.

According to an example of the present invention, in a fifth aspect, this object is for example achieved by an apparatus comprising:

a transmitter configured to transmit, after a network entry authentication procedure, between an access network gateway entity and one of a terminal and a serving entity, generated terminal mobility restriction information in the form of at least one text information element comprised in an authentication notification message.

According to further refinements of the example of the present invention as defined under the above fifth aspect, the apparatus further comprises a generator configured to generate the authentication notification message comprising the terminal mobility restriction information in the form of the at least one text information element.

According to an example of the present invention, in a sixth aspect, this object is for example achieved by an apparatus comprising:

a receiver configured to receive, after a network entry authentication procedure, between an access network gateway entity and one of a terminal and a serving entity, terminal mobility restriction information in the form of at least one text information element comprised in an authentication notification message.

According to further refinements of the example of the present invention as defined under the above fifth and sixth aspects, if the transmitter or the receiver is comprised in the access network gateway entity and the serving entity, at least one of the following applies: the serving entity is situated in one of a home connectivity service network and a local visited connectivity service network, the authentication notification message is carried by one of a remote authentication dial-in user service request and a diameter request, both relating to an access, authorization, and accounting protocol, and the authentication notification message is carried across an R3 interface between the access network gateway entity and the serving entity;

the at least one text information element is constituted by a type-length-value information element;

the at least one type-length-value information element comprises sub information elements relating to at least one of a restriction type, a list of allowed base stations, a list of prohibited base stations, and an allowed location of the terminal;

the authentication notification message is constituted by a extensible authentication protocol notification request message.

According to an example of the present invention, in a seventh aspect, this object is for example achieved by an apparatus comprising:

a transmitter configured to transmit, via network entity management procedures, terminal mobility restriction information in the form of at least one additional leaf node being added to a network entity management object.

According to further refinements of the example of the present invention as defined under the above seventh aspect, the apparatus further comprises an adder configured to add the at least one additional leaf node to the network entity management object.

According to an example of the present invention, in an eighth aspect, this object is for example achieved by an apparatus comprising:

a receiver configured to receive, via network entity management procedures, terminal mobility restriction information in the form of at least one additional leaf node being added to a network entity management object.

According to further refinements of the example of the present invention as defined under the above seventh and eighth aspects, the additional leaf node is added to a primary subscriber parameters leaf node of the management object;

the additional leaf node comprises at least one of a status field, a tree occurrence field, a format field and an access type field;

the additional leaf node represents a value indicating one of a mobile restriction, a fixed restriction and a nomadic restriction;

the additional leaf node is added under both a current subscription node and other subscriptions node in the network;

the network entity management object is constituted by a worldwide interoperability for microwave access supplementary management object;

the additional leaf node is further added to at least one of a contractual agreement preference list leaf node and a roaming agreement preference list leaf node;

a second additional leaf node is further added to the additional leaf node of the management object;

the second additional leaf node comprises a mobility restriction and at least one list indicating elements where the mobility restriction is to be applied, the elements being at least one of network access providers, visited network service providers, and base stations;

the network entity management procedures are based on one of an open mobile alliance device management protocol and a technical report 069 protocol;

the apparatus further comprises a judger configured to judge whether an accuracy of the terminal mobility restriction information is insufficient or not, wherein the transmitter or the receiver is further configured to transmit or receive, if the accuracy is judged to be insufficient, prior to another network entry authentication procedure, second terminal mobility restriction information in the form of one text information element of a fixed length in one of a downlink channel descriptor message, a ranging response message, a terminal basic capability response message or a registration response message;

the terminal is constituted by one of a mobile station, a mobile phone, a personal digital assistant, an internet tablet, a laptop, and a customer premises equipment unit;

the access network gateway entity is constituted by at least one of an access network gateway and an access network authenticator;

the serving entity is constituted by an access, authorization, and accounting proximity server.

According to further refinements of the example of the present invention as defined under the above fifth to eighth aspects, at least one, or more of a transmitter, a generator, a receiver, an adder, a judger and the apparatus is implemented as a chipset or module.

According to an example of the present invention, in a ninth aspect, this object is for example achieved by a system comprising:

an apparatus according to the above fifth aspect; and
an apparatus according to the above sixth aspect;
or
an apparatus according to the above seventh aspect; and
an apparatus according to the above eighth aspect.

According to an example of the present invention, in a tenth aspect, this object is for example achieved by a computer program product comprising code sections for performing a method according to any one of the above first to fourth aspects when run on a processing means or module.

According to an example of the present invention, in an eleventh aspect, this object is for example achieved by a data structure comprising:

at least one text information element comprised in an authentication notification message, the at least one text information element constituting terminal mobility restriction information.

According to further refinements of the example of the present invention as defined under the above eleventh aspect, the at least one text information element is constituted by a type-length-value information element;

the at least one type-length-value information element comprises sub information elements relating to at least one of a restriction type, a list of allowed base stations, a list of prohibited base stations, and an allowed location of the terminal;

the authentication notification message is constituted by a extensible authentication protocol notification request message.

According to an example of the present invention, in a twelfth aspect, this object is for example achieved by a data structure comprising:

at least one additional leaf node being added to a network entity management object, the at least one additional leaf node constituting terminal mobility restriction information.

According to further refinements of the example of the present invention as defined under the above twelfth aspect, the additional leaf node is added to a primary subscriber parameters leaf node of the management object;

the additional leaf node comprises at least one of a status field, a tree occurrence field, a format field and an access type field;

the additional leaf node represents a value indicating one of a mobile restriction, a fixed restriction and a nomadic restriction;

the additional leaf node is added to both a current subscription leaf node and other subscriptions leaf node in the network;

the network entity management object is constituted by a worldwide interoperability for microwave access supplementary management object;

the additional leaf node is further added to at least one of a contractual agreement preference list leaf node and a roaming agreement preference list leaf node;

a second additional leaf node is further added to the additional leaf node of the management object;

the second additional leaf node comprises a mobility restriction and at least one list indicating elements where the mobility restriction is to be applied, the elements being at least one of network access providers, visited network service providers, and base stations;

second terminal mobility restriction information is constituted by one text information element of a fixed length in one of a downlink channel descriptor message, a ranging response message, a terminal basic capability response message or a registration response message.

Mobility restrictions may be useful e.g. for implementing a 'home zone' or other use cases, where the subscriber and device is restricted to a specific area or set of base stations. Also, mobility restrictions may be necessary according to country-specific regulation. This might require a WiMAX network that in general is capable of offering full mobility support for subscribers and WiMAX devices to restrict specific subscribers and devices to a specific area, or restrict mobility in terms of possible handovers between base stations, access networks or even different access technologies (including different radio technologies like WiMAX/WLAN or access according to the 3GPP2 or 3GPP specifications).

In this description, the term "SS" is used to refer to the subscriber station, also named as mobile station (MS) or terminal. It can be a mobile device like a mobile phone, personal digital assistant (PDA), internet tablet, laptop, customer premises equipment (CPE) unit or similar type of device. SS also includes the fact that information passed to the SS may sometimes be shown to the subscriber/user.

Potential types of information that are considered beneficial for the SS when either entering the network or already being connected to the network, include:

The fact that the network only offers limited mobility support;

The type of mobility restrictions which apply

Information whether handover (HO) to other base stations (BSs) is allowed or not, or whether MS initiated HO is prohibited;

Information about an allowed region (like geodetic or civic location information about an area where access for this SS is allowed);

Information about a set of base stations that are allowed to be accessed (so-called "whitelist") or not allowed (so-called "blacklist").

Information provided to the SS can be related to a mobility restriction applying to a whole network or network segment, to individual SSs or a group of SSs. This can, e.g., be based on an individual subscription, or e.g. on the actual network operator information ('home network') of a roaming SS (i.e. specific mobility restrictions applying to all subscribers of a specific roaming partner's network only).

In this connection, examples of the present invention enable one or more of the following:

Providing appropriate information to the SS;

Improving the implementation of mobility restrictions in WiMAX networks;

Improving existing solutions for all related work in the WiMAX area;

Enabling informing a roaming subscriber about the roaming visited/access network being one with mobility restrictions;

Avoiding useless network entry attempts from those SSs that are not permitted at the BS at stake, according the network's mobility restrictions;

Avoiding unnecessary MS initiated handover preparation or execution attempts;

Improving user experience for the SS/subscriber;

Enabling efficient network operation with avoiding a potentially large number of unnecessary denied handover or network entry attempts due to the fact that the SS is not aware of the information required to judge whether the current network enforces mobility restrictions and whether such operation like a handover can succeed or not.

BRIEF DESCRIPTION OF THE DRAWINGS

Examples of the present invention are described herein below with reference to the accompanying drawings, in which:

FIG. 6 shows a data structure for informing roaming restrictions according to the first example of the present invention; and FIG. 7 shows a data structure for informing roaming restrictions according to the second example of the present invention.

DETAILED DESCRIPTION OF EXAMPLES OF THE PRESENT INVENTION

Examples of the present invention are described herein below by way of example with reference to the accompanying drawings.

It is to be noted that for this description, the terms "subscriber station; type-length-value information element; extensible authentication protocol notification request message; WiMAX supplementary management object; ASN-GW; and AAA server" are examples for "terminal; text information element; authentication notification message; network entity management object; access network gateway entity; and serving entity", respectively, without restricting the latter-named terms to the special technical or implementation details imposed to the first-named terms.

Figure 1:
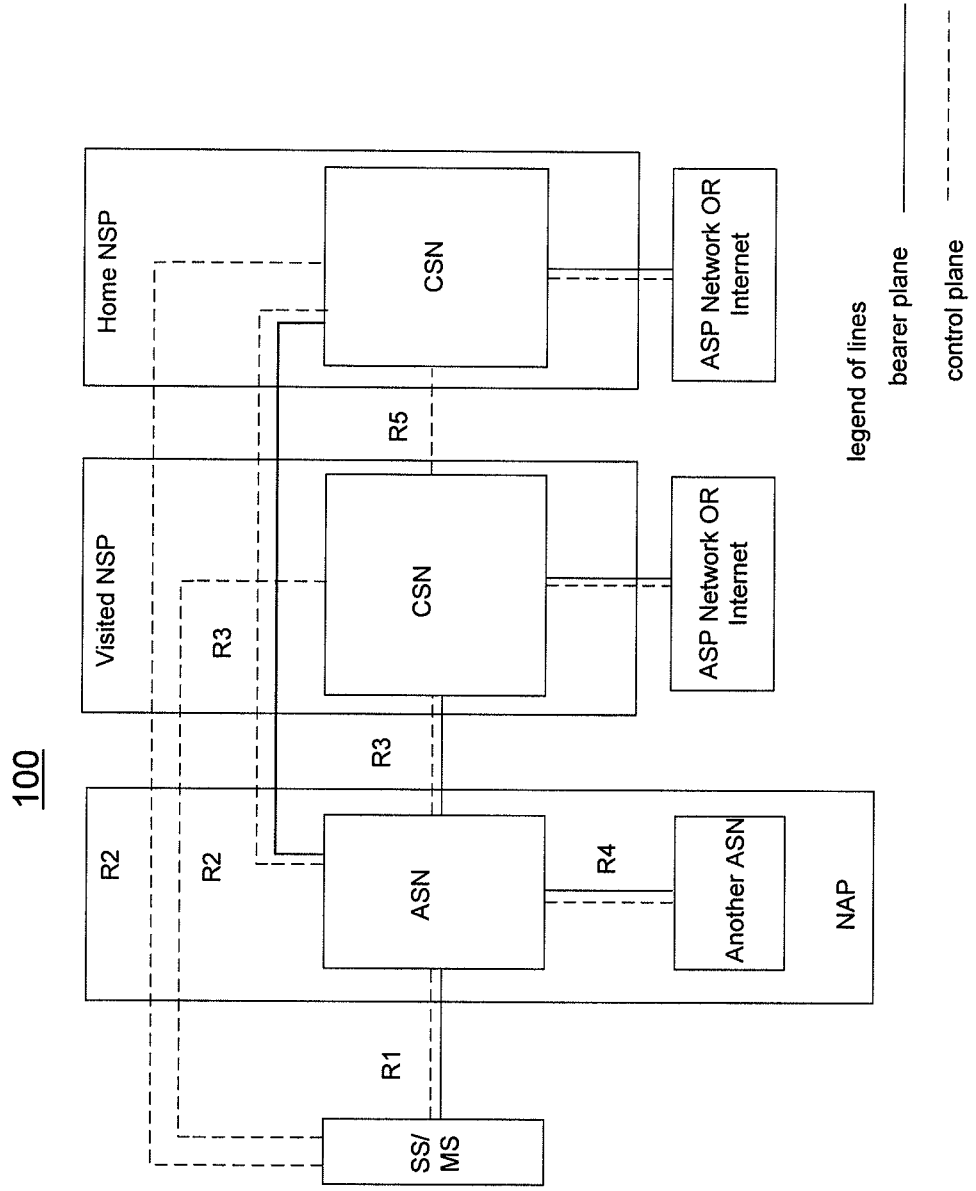
FIG. 1 shows the above-described network architecture for WiMAX networks.
Figure 2:
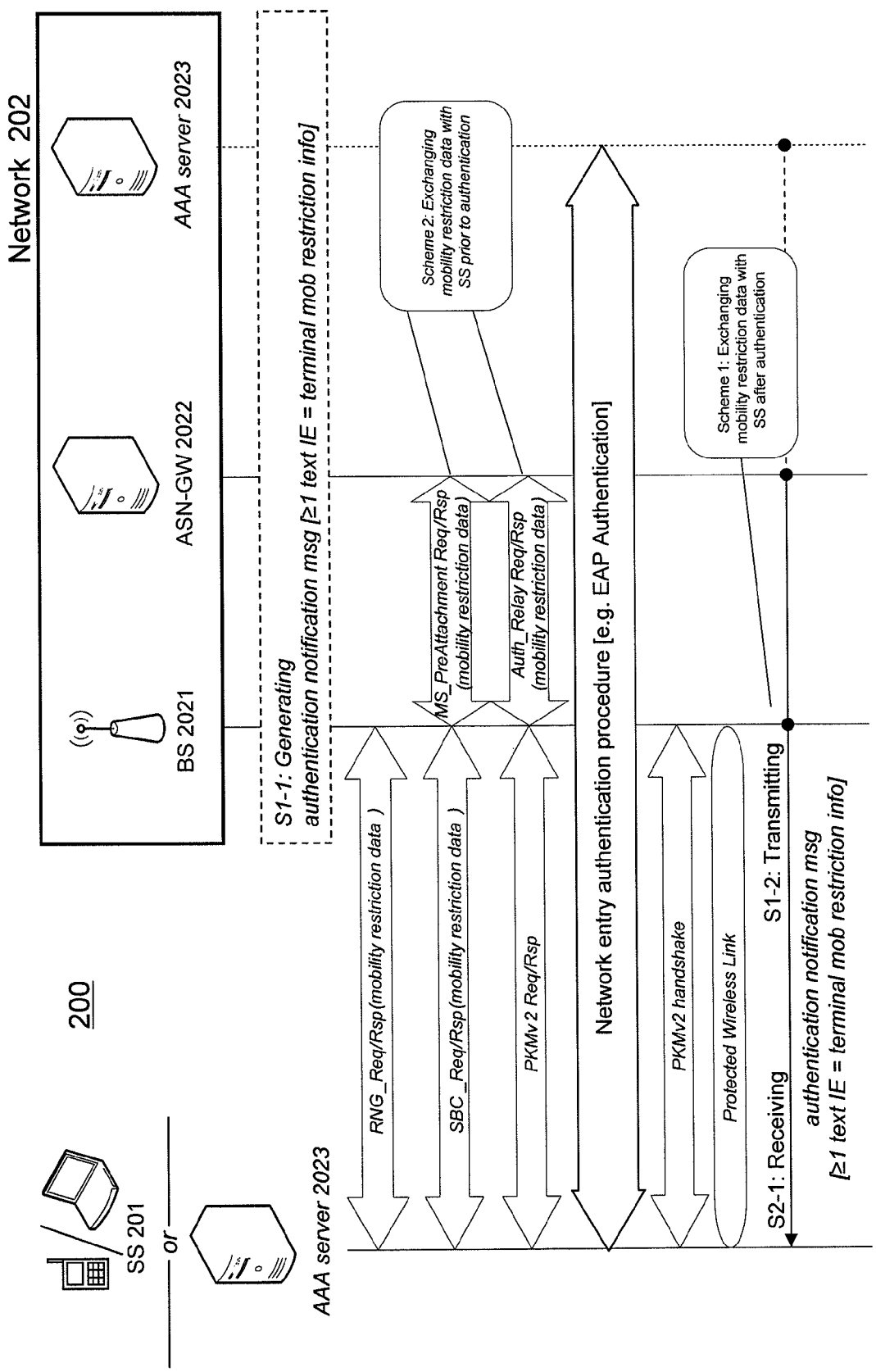
FIG. 2 shows methods for informing roaming restrictions according to a first example of the present invention deploying the third scheme.
Figure 3:
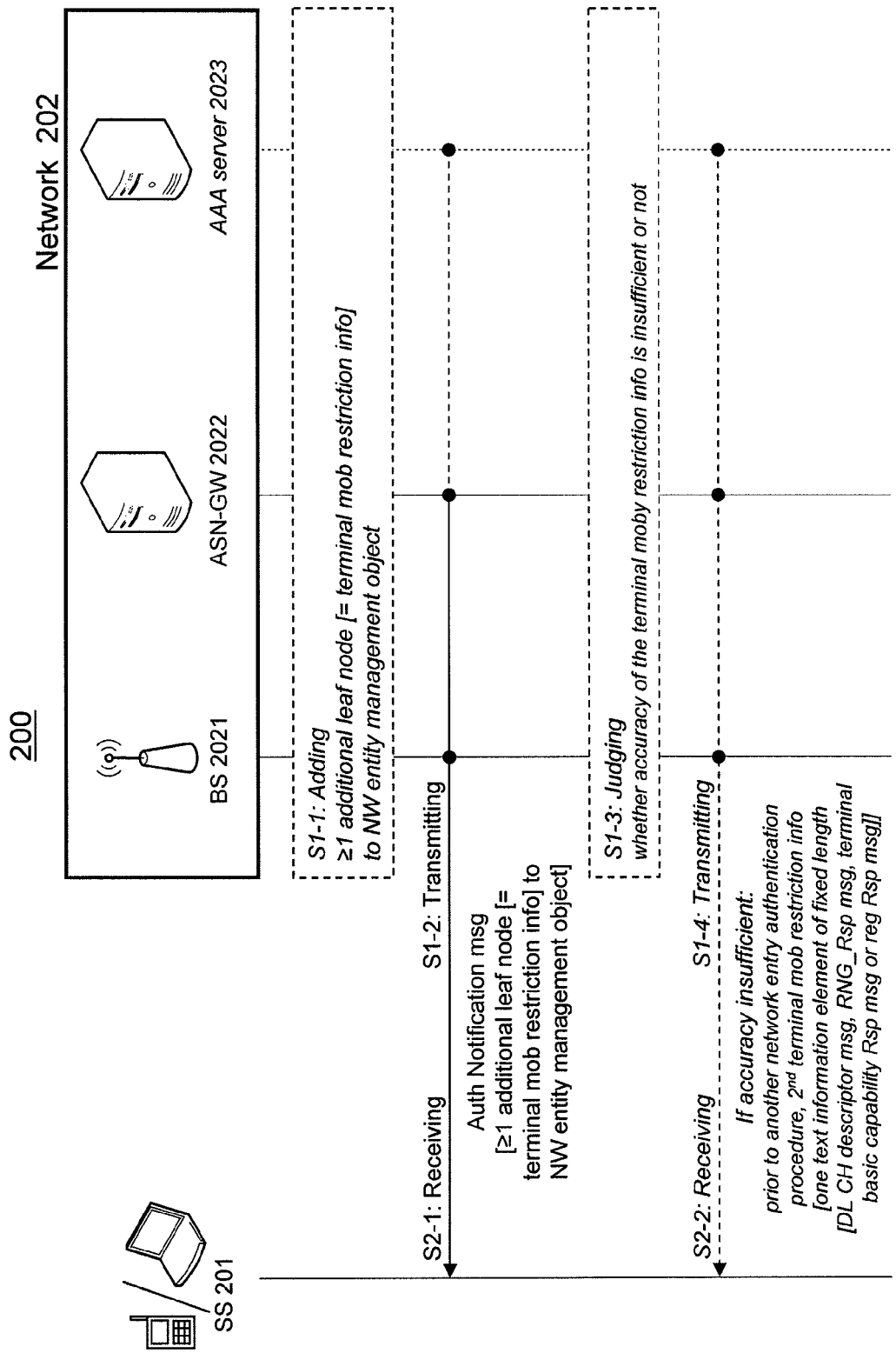
FIG. 3 shows methods for informing roaming restrictions according to a second example of the present invention deploying the third scheme.

FIGS. 2 and 3 show methods for informing roaming restrictions according to the first and second examples of the present invention. Signaling between elements is indicated in horizontal direction, while time aspects between signaling may be reflected in the vertical arrangement of the signaling sequence as well as in the sequence numbers. It is to be noted that the time aspects indicated in FIG. 2 do not necessarily restrict any one of the method steps shown to the step sequence outlined. This applies in particular to method steps that are functionally disjunctive with each other: for example, optional step S1-1 (generating) is shown to take place before the preparatory steps (RNG_Req/Rsp etc.) before the network entry authentication procedure; however, step S1-1 and the preparatory steps may also be performed in another order. Within FIGS. 2 and 3, for ease of description, means or portions which may provide main functionalities are depicted with solid functional blocks or arrows and/or a normal font, while means or portions which may provide optional functions are depicted with dashed functional blocks or arrows and/or an italic font.

As shown in FIGS. 2 and 3, a communication system 200 may comprise an SS 201 and a network 202, which in turn may comprise a BS 2021, an ASN-GW 2022 and an AAA server 2023. Furthermore, it is to be noted that the AAA server 2023 shown on the left of FIG. 2 is identical to the AAA server 2023 shown inside the network 202.

As optional preparatory measure, in an optional step S1-1, e.g. the ASN-GW 2022 (in conjunction with the BS 2021) may perform generating ( ) an authentication notification message comprising terminal mobility restriction information in the form of at least one text information element.

Then, in various optional steps prior to the network entry authentication procedure (RNG_Req/Rsp to Auth_Relay Req/Rsp), e.g. a scheme 2 (to be described herein below) for exchanging the terminal mobility restriction information may be performed. In addition, there may be performed optional steps for a privacy key management version 2 (PKMv2) handshake procedure and establishing a protected wireless link between the SS 201 and the BS 2021.

Then, in step S1-2, e.g. the ASN-GW 2022 (in conjunction with BS 2021) may perform transmitting, after the network entry authentication procedure, between an access network gateway entity (e.g. ASN-GW 2022) and one of a terminal (e.g. SS 201) and a serving entity (e.g. AAA server 2023), the generated terminal mobility restriction information in the form of the at least one text information element (e.g. TLVs) comprised in an authentication notification message (e.g. EAP notification msg).

Then, in step S2-1, e.g. the SS 201 (or alternatively, the AAA server 2023) may perform receiving the terminal mobility restriction information in the above-described form comprised in the authentication notification message (e.g. EAP notification msg).

According to further developments of the methods according to the first example of the present invention, if the transmitting or receiving is performed between the access network gateway entity and the serving entity, the serving entity may be situated in a home or a local visited connectivity service network; the authentication notification message may be carried by a remote authentication dial-in user service (RADIUS) request or a diameter request, both relating to an access, authorization, and accounting protocol; and/or the authentication notification message may be carried across the R3 interface between the access network gateway entity and the serving entity.

In addition, according to the first example, the at least one text information element may be constituted by a type-length-value information element, and the at least one type-length-value information element may comprise sub information elements relating to a restriction type, a list of allowed base stations, a list of prohibited base stations, and/or an allowed location of the terminal. In this context, it is to be noted that the term "allowed location" may also comprise network access providers and/or visited network service providers. Further, the authentication notification message may be constituted by an extensible authentication protocol notification request message.

As shown in FIG. 3, according to the second example of the present invention, in an optional preparatory step S1-1, e.g. the ASN-GW 2022 (in conjunction with the BS 2021) may perform adding at least one additional leaf node to a network entity management object (e.g. WiMAX supplementary management object).

Then, in step S1-2, e.g. the ASN-GW 2022 (in conjunction with the BS 2021) may perform transmitting, via network entity management procedures, terminal mobility restriction information in the form of the at least one additional leaf node being added to the network entity management object.

Accordingly, in step S2-1, e.g. the SS 201 may perform receiving the terminal mobility restriction information in the above-described form.

According to further developments according to the second example of the present invention, the additional leaf node may be added to a primary subscriber parameters leaf node of the management object. Alternatively or additionally, the additional leaf node may comprise a status field, a tree occurrence field, a format field and/or an access type field. Further, the additional leaf node may represent a value indicating a mobile restriction, a fixed restriction or a nomadic restriction. Finally, the additional leaf node may be added under both a current subscription node and other subscriptions node in the network.

Further, according to the second example, the network entity management object may be constituted by a WiMAX supplementary management object.

Still further, according the second example, the additional leaf node may be further added to a contractual agreement preference list leaf node and/or a roaming agreement preference list leaf node. In addition or alternatively, a second additional leaf node may be further added to the additional leaf node of the management object. Such a second additional leaf node may comprise a mobility restriction and at least one list indicating elements where the mobility restriction may have to be applied, the elements being network access providers, visited network service providers, and/or base stations. Finally, the network entity management procedures may be based on an open mobile alliance device management protocol or a technical report 069 protocol.

Finally, according to the second example, in an optional step S1-3, e.g. the ASN-GW 2022 (in conjunction with the BS 2021) may perform judging ( ) whether an accuracy of the terminal mobility restriction information is insufficient or not. Further, in an optional step S1-4, e.g. the ASN-GW 2022 (in conjunction with the BS 2021) may perform, if the accuracy is judged to be insufficient, transmitting or receiving, prior to another network entry authentication procedure, second terminal mobility restriction information in the form of one text information element (e.g. TLV) of a fixed length (e.g. one octet) in a downlink channel descriptor message, a ranging response message, a terminal basic capability response message or a registration response message.

Figure 4:
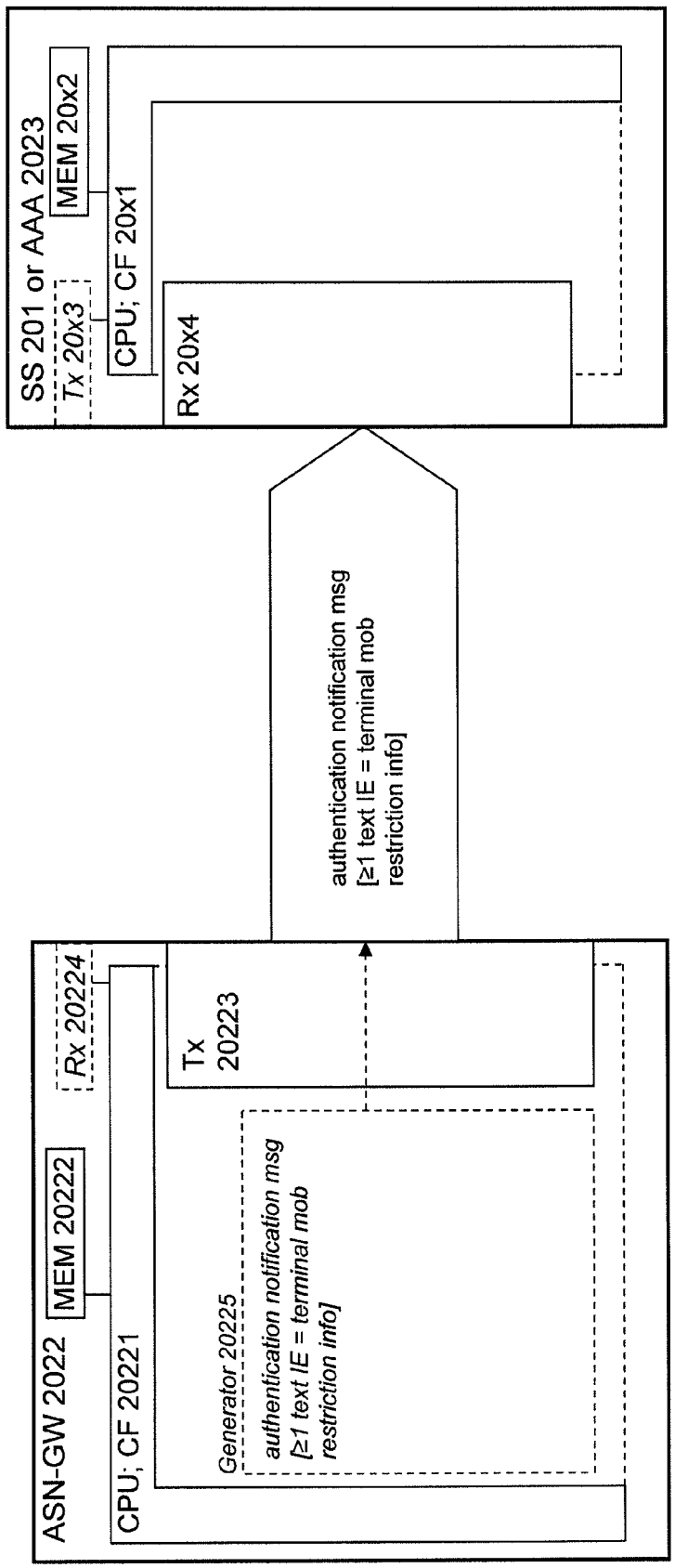
FIG. 4 shows apparatuses (e.g. SS 201 or AAA server 2023 and ASN-GW 2022) for informing roaming restrictions according to the first example of the present invention.
Figure 5:
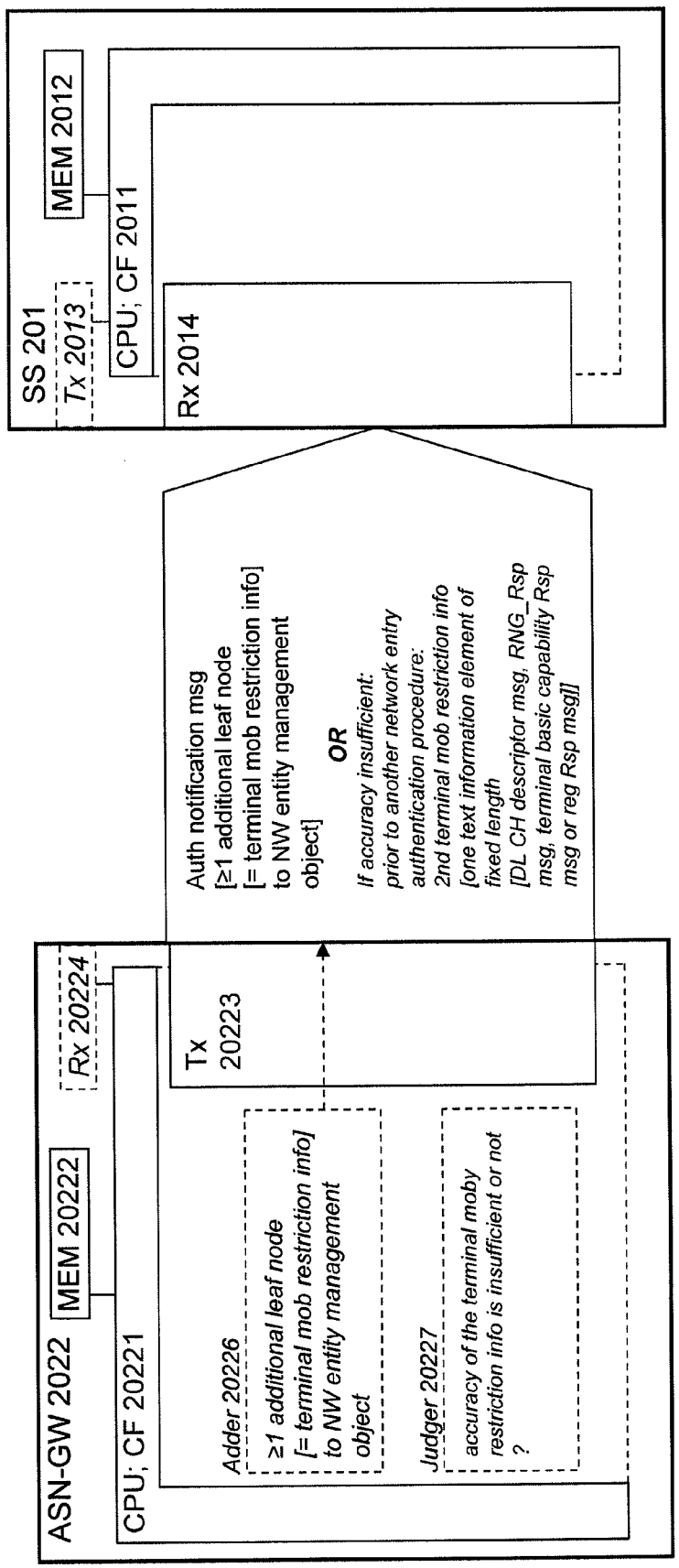
FIG. 5 shows apparatuses (e.g. SS 201 and ASN-GW 2022) for informing roaming restrictions according to the second example of the present invention.

FIGS. 4 and 5 show apparatuses (e.g. SS 201/AAA server 2023 and ASN-GW 2022) for informing roaming restrictions according to the first and second examples of the present invention. Within FIGS. 4 and 5, for ease of description, means or portions which may provide main functionalities are depicted with solid functional blocks or arrows and a normal font, while means or portions which may provide optional functions are depicted with dashed functional blocks or arrows and an italic font.

The SS 201 may comprise a CPU (or core functionality CF) 2011, a memory 2012, an optional transmitter (or means for transmitting) 2013 and a receiver (or means for receiving) 2014.

The ASN-GW 2022 may comprise a CPU (or core functionality CF) 20221, a memory 20222, a transmitter (or means for transmitting) 20223, an optional receiver (or means for receiving) 20224 and an optional generator (or means for generating) 20225. Alternatively, as shown in FIG. 5, the ASN-GW may also comprise an optional adder (or means for adding) 20226 and an optional judger (or means for judging) 20227.

As indicated by the dashed extension of the functional blocks of the CPUs 2011, 20221, 20231, the means for transmitting 20223, the means for generating 20225, the means for adding 20226 and the means for judging 20227 of the ASN-GW 2022, the means for receiving 2014 of the SS 201 as well as the means for receiving 20234 of the AAA server 2023 may be functionalities running on the CPUs 201, 20221, 20231 of the SS 201, the ASN-GW 2022 or the AAA server 2023, respectively, or may alternatively be separate functional entities or means.

The CPUs 20x1 (wherein x=1, 21 and 23) may respectively be configured to process various data inputs and to control the functions of the memories 20x2, the means for transmitting 202x3 and the means for receiving 20x4 (and the means for generating 20225, the means for adding 20226 and the means for judging 20227 of the ASN-GW 2022). The memories 20x2 may serve e.g. for storing code means for carrying out e.g. the methods according to the first and second examples of the present invention, when run e.g. on the CPUs 20x1. It is to be noted that the means for transmitting 20x3 and the means for receiving 20x4 may alternatively be provided as respective integral transceivers. It is further to be noted that the transmitters/receivers may be implemented i) as physical transmitters/receivers for transceiving e.g. via the air interface (e.g. in case of transmitting between the SS 201 and the ASN-GW 2022), ii) as routing entities e.g. for transmitting/receiving data packets e.g. in a PS (packet switched) network (e.g. between the BS 2021 and the ASN-GW 2022 when disposed as separate network entities), iii) as functionalities for writing/reading information into/from a given memory area (e.g. in case of shared/common CPUs or memories e.g. of the BS 2021 and the ASN-GW 2022 when disposed as an integral network entity (not shown)), or iv) as any suitable combination of i) to iii).

As optional preparatory measure, e.g. the means for generating 20225 of the ASN-GW 2022 (in conjunction with the BS 2021) may perform generating an authentication notification message comprising terminal mobility restriction information in the form of at least one text information element.

Then, e.g. the means for transmitting 20223 of the ASN-GW 2022 (in conjunction with BS 2021) may perform transmitting, after the network entry authentication procedure, between the access network gateway entity (e.g. ASN-GW 2022) and one of the terminal (e.g. SS 201) and the serving entity (e.g. AAA server 2023), the generated terminal mobility restriction information in the form of the at least one text information element (e.g. TLVs) comprised in an authentication notification message (e.g. EAP notification msg).

Then, e.g. the means for receiving 2014 of the SS 201 (or alternatively, the means for receiving 20234 of the AAA server 2023) may perform receiving the terminal mobility restriction information in the above-described form comprised in the authentication notification message (e.g. EAP notification msg).

According to further developments of the apparatuses according to the first example of the present invention, if the means for transmitting or the means for receiving is situated in the access network gateway entity and the serving entity, the serving entity may be situated in a home or a local visited connectivity service network; the authentication notification message may be carried by a remote authentication dial-in user service (RADIUS) request or a diameter request, both relating to an access, authorization, and accounting protocol; and/or the authentication notification message may be carried across the R3 interface between the access network gateway entity and the serving entity.

In addition, according to the first example, the at least one text information element may be constituted by a type-length-value information element, and the at least one type-length-value information element may comprise sub information elements relating to a restriction type, a list of allowed base stations, a list of prohibited base stations, and/or an allowed location of the terminal. Further, the authentication notification message may be constituted by an extensible authentication protocol notification request message.

As shown in FIG. 5, according to the second example of the present invention, e.g. the means for adding 20226 of the ASN-GW 2022 (in conjunction with the BS 2021) may perform adding at least one additional leaf node to a network entity management object (e.g. WiMAX supplementary management object).

Then, e.g. the means for transmitting of the ASN-GW 2022 (in conjunction with the BS 2021) may perform transmitting, via network entity management procedures, terminal mobility restriction information in the form of the at least one additional leaf node being added to the network entity management object.

Accordingly, e.g. the means for receiving 2014 of the SS 201 may perform receiving the terminal mobility restriction information in the above-described form.

According to further developments according to the second example of the present invention, the additional leaf node may be added to a primary subscriber parameters leaf node of the management object. Alternatively or additionally, the additional leaf node may comprise a status field, a tree occurrence field, a format field and/or an access type field. Further, the additional leaf node may represent a value indicating a mobile restriction, a fixed restriction or a nomadic restriction. Finally, the additional leaf node may be added under both a current subscription node and other subscriptions node in the network.

Further, according to the second example, the network entity management object may be constituted by a WiMAX supplementary management object.

Still further, according the second example, the additional leaf node may be further added to a contractual agreement preference list leaf node and/or a roaming agreement preference list leaf node. In addition or alternatively, a second additional leaf node may be further added to the additional leaf node of the management object. Such a second additional leaf node may comprise a mobility restriction and at least one list indicating elements where the mobility restriction may have to be applied, the elements being network access providers, visited network service providers, and/or base stations. In this context, it is to be noted that the term "allowed location" may also comprise network access providers and/or visited network service providers. Finally, the network entity management procedures may be based on an open mobile alliance device management protocol or a technical report 069 protocol.

Finally, according to the second example, e.g. the means for judging 20227 of the ASN-GW 2022 (in conjunction with the BS 2021) may perform judging whether an accuracy of the terminal mobility restriction information is insufficient or not. Further, e.g. the means for transmitting 20223 of the ASN-GW 2022 (in conjunction with the BS 2021) or the means for receiving 2014 of the SS 201 may perform, if the accuracy is judged to be insufficient, transmitting or receiving, prior to another network entry authentication procedure, second terminal mobility restriction information in the form of one text information element (e.g. TLV) of a fixed length (e.g. one octet) in a downlink channel descriptor message, a ranging response message, a terminal basic capability response message or a registration response message.

Furthermore, at least one of, or more of means for transmitting 20223, means for generating 20225, means for receiving 2014, 20234, means for adding 20226, means for judging 20227 and/or the SS 201, the ASN-GW 2022 and/or the AAA server 2023, or the respective functionalities carried out, may be implemented as a chipset or module.

Finally, examples of the present invention also relate to a system which may comprise an SS or AAA server according to the above-described first or second examples, and an ASN-GW according to the above-described first or second examples.

Still further, as shown in FIGS. 6 and 7, the first and second examples according to the present invention may also comprise respective data structures for implementing the functionalities carried out.

That is, as shown in FIG. 6, according to the first example, a data structure may comprise at least one text information element (e.g. TLVs) comprised in an authentication notification message (e.g. EAP notification msg), the at least one text information element constituting terminal mobility restriction information.

According to further developments of the first example, the data structure may be modified such that the at least one text information element may be constituted by a type-length-value information element, and the at least one type-length-value information element may comprise sub information elements relating to a restriction type, a list of allowed base stations, a list of prohibited base stations, and/or an allowed location of the terminal. Further, the authentication notification message may be constituted by a extensible authentication protocol notification request message.

In addition, as shown in FIG. 7, according to the second example, a data structure may comprise at least one additional leaf node being added to a network entity management object, the at least one additional leaf node constituting terminal mobility restriction information.

According to further developments of the second example, the data structure may be modified such that the additional leaf node may be added to a primary subscriber parameters leaf node of the management object. Alternatively, the additional leaf node may comprise a status field, a tree occurrence field, a format field and/or an access type field. Further, the additional leaf node may represent a value indicating a mobile restriction, a fixed restriction or a nomadic restriction. More-over, the additional leaf node may be added to both a current subscription leaf node and other subscriptions leaf node in the network. Additionally, the network entity management object may be constituted by a WiMAX supplementary management object. Still further, the additional leaf node may be further added to at least one of a contractual agreement preference list leaf node and a roaming agreement preference list leaf node.

Additionally, a second additional leaf node may be further added to the additional leaf node of the management object, and the second additional leaf node may comprise a mobility restriction and at least one list indicating elements where the mobility restriction is to be applied, the elements being network access providers, visited network service providers, and/or base stations. And, second terminal mobility restriction information may be constituted by one text information element (e.g. TLV) of a fixed length (e.g. one octet) in one of a downlink channel descriptor message, a ranging response message, a terminal basic capability response message or a registration response message.

Without being restricted to the details following in this section, the embodiment of the present invention may be summarized as follows:
It is proposed to provide the SS with information that is not yet available for mobility restriction use that is sent by a WiMAX ASN or CSN network. Three different methods of how to provide such information to the SS over the wireless interface are proposed:
After the network entry authentication procedure (based e.g. on the EAP protocol, IETF RFC 3748) has been performed—immediately, or at a later point in time, e.g. during a HO attempt initiated by the SS:
The network sends an EAP notification message to the SS that carries the required information the network wants to provide to the SS about applying mobility restrictions. Information like the one listed herein above will be carried as part of the text data carried in the EAP notification message.

1) Prior to Authentication During WiMAX Network Entry:
The network informs the SS during the initial ranging procedures and network entry signaling across the wireless MAC layer according to the 802.16 set of specifications prior to the SS starting the EAP authentication procedure with the network.

2) Via Device Management Procedures:
Home operator informs the SS about mobility restrictions by including this information into subscription information and hence enabling transmitting of it into the SS via normal device management procedures.

3) During the SS Handover:
When the SS initiates a handover, it sends a list of possible target base stations to the network, and the network responds with a message containing a list of (possibly different) base stations that the MS is allowed to move to. It is proposed that the base station list sent by the network may be amended by a new indication informing the SS that it can move only to the base stations on the list because of the fixed/nomadic restrictions.

A benefit of scheme 1 above is that the proposed solution does not impact the implementation of the wireless MAC/PHY layers, so no changes to the specifications of the WiMAX R1 radio interface are necessary. Also in scheme 1 limitations of the amount of information that can be exchanged are subject to the limitations applying to EAP notification messages that are less stringent than those set for the wireless MAC/PHY layers. In addition, schemes 1 and 3 enable the network to provide mobility restrictions on per subscription basis.

Further, scheme 2 has the benefit of providing information about potential mobility restrictions of an access/roaming network at a very early point of the network detection and selection procedure which is considered beneficial.

An advantage of method 3 may be that it enables to provide the information just once when the subscription is created or changes. At least the high-level restriction of H-NSP is useful to be transferred using this scheme.

So as another embodiment, a combination of all proposed methods is considered beneficial, where initial information about home operator support or subscription related support for mobility is received by the SS using scheme 3. The principal fact that the network is a mobility restricted access, is communicated to the SS by scheme 2 in cases the information transferred via scheme 3 is not accurate enough. In addition, at any point in time after network authentication like in case of initial network entry or in cases of forbidden handover attempts additional information like the one sketched in section 2) can be provided to the SS.

According to schemes 1 and 2 described hereinabove or a combination of both, mobility restriction data can be exchanged with the SS prior to the SS authenticating with the WiMAX network, after authentication, or both.

Scheme 2 ("Information Outside Authentication"):
Mobility restriction data prior to authentication—mapping to scheme 2 above in this implementation example is proposed to be carried from the WiMAX BS to the SS by DCD message, RNG_RSP (Ranging response) message, by the SBC_RSP (SS basic capability response) message, or by the REG-RSP (registration response) message. The information exchanged in the implementation example is proposed to be a TLV (type-length-value) information element that carries one octet of data as the value with the following meaning:
0=Fixed
1=Nomadic
2-255 reserved.
(alternatively, indication of 'Fixed' could be achieved by not setting bit #0 in "HO type support" in the DCD_message)

In scheme 3, the mobility restrictions would be communicated to the SS during the handover procedure in the MOB_BSHO-RSP or MOB_BSHO-REQ messages. The same TLV information element that is proposed above for RNG_Rsp and SBC_Rsp messages may be used during the handover phase in MOB_BSHO-RSP or MOB_BSHO-REQ messages to indicate mobility restrictions to the SS.

Absence of this TLV indicates that no specific mobility restrictions are advertised by the network (alternatively, an explicit value like 2 could indicate this and that should be the default value to keep backwards compatibility).

Another realization of this method is to extend existing HO type support TLV (which is sent in DCD message) by adding an entry "Bit 4: Nomadic" as follows:
Bit 0: HO
Bit 1: MDHO
Bit 2: FBSS HO
Bit 3: BS_Controlled_HO; This bit can be set to one only if Bit 0 is also set to one.
Bit 4: Nomadic
Bit 5-7: Reserved
The actual mobility restriction data sent to the SS can be configured to all the BSs. Or alternatively, this information can be transferred across the R6 interface from the ASN-GW to the BS the SS is talking to. In the implementation example such information can be requested by the BS and returned by the ASN-GW in MS_Preattachment or in Auth-Relay messages (except the cases where DCD or RNG-RSP are used).
Scheme 1 ("Information During or after Authentication"):

Scheme 1 is realized as part of this implementation example by the ASN-GW/Authenticator in the WiMAX access network (ASN) sending an EAP Notification Request message to the SS that is being answered by an EAP Notification Response message. The EAP Notification Request message carries the required mobility restriction data to be provided to the SS in the form of one or several TLVs (alternatively, the notification message exchange can also be performed by a AAA proxy/server in a CSN network like a home CSN or a local visited CSN).

In this case, the EAP notification messages would be carried by the network AAA protocol RADIUS or Diameter across the R3 interface between the AAA proxy/server and the ASN-GW).

TLVs in EAP Notification Request message can, for example, be implemented as shown in FIG. 6

Scheme 3:

Transmitting of mobility restrictions into the SS in scheme 3 is done via device management procedures. In WiMAX, two protocols can be used for this purpose, namely OMA-DM and TR-069. An implementation example of this invention modifies an OMA DM management object named WiMAX Supplementary Management Object.

A leaf node could be added below primary subscription information as follows (description of this node is applicable to other possible "MobilityRestriction" nodes given further down in this invention):

WiMAXSupp/Operator/<X>/SubscriptionParameters/Primary/MobilityRestriction

And a similar node needs to be added into other subscription data:

WiMAXSupp/Operator/<X>/SubscriptionParameters/OtherSubscription/<X>/MobilityRestriction Below there are some other possibilities how mobility restrictions could be added into OMA-DM MOs.

The implementation of this example of the present invention could be further enlarged by adding mobility restriction data into CAPL:

WiMAXSupp/Operator/<X>/NetworkParameters/CAPL/Entries/<X>/MobilityRestriction

This leaf node would indicate the mobility restrictions in a specific NAP. However, this is not subscription specific information but only network specific as it is under "NetworkParameters" instead of "Subscription Parameters".

More changes could be introduced to CAPL to enable BS granularity for the mobility restrictions such as giving a list of BSs with a particular mobility restriction.

RAPL can also include mobility restrictions:

WiMAXSupp/Operator/<X>/NetworkParameters/RAPL/Entries/<X>/MobilityRestriction

This node would indicate the mobility restrictions in a specific V-NSP.

More changes could be introduced to RAPL to enable NAP/BS granularity for the mobility restrictions such as giving a list of NAPs/BSs with a particular mobility restriction.

More granular (BS/NAP/V-NSP granularity) subscription specific mobility restrictions could be added into "SubscriptionParameters" (these examples are for primary subscription and similar nodes would need to be copy-pasted into other subscriptions):

WiMAXSupp/Operator/<X>/SubscriptionParameters/Primary/MobilityRestrictions/<X>/Restriction Mobility restriction.

WiMAXSupp/Operator/<X>/SubscriptionParameters/Primary/MobilityRestrictions/<X>/NAPList WiMAXSupp/Operator/<X>/SubscriptionParameters/Primary/MobilityRestrictions/<X>/NAPList/<X>

WiMAXSupp/Operator/<X>/SubscriptionParameters/Primary/MobilityRestrictions/<X>/NAPList/<X>/NAP List of NAPs where this mobility restriction applies can be represented by above three nodes.

WiMAXSupp/Operator/<X>/SubscriptionParameters/Primary/MobilityRestrictions/<X>/V-NSPList WiMAXSupp/Operator/<X>/SubscriptionParameters/Primary/MobilityRestrictions/<X>/V-NSPList/<X>

WiMAXSupp/Operator/<X>/SubscriptionParameters/Primary/MobilityRestrictions/<X>/V-NSPList/<X>/V-NSP List of V-NSPs where this mobility restriction applies can be represented by above three nodes.

WiMAXSupp/Operator/<X>/SubscriptionParameters/Primary/MobilityRestrictions/<X>/BSList WiMAXSupp/Operator/<X>/SubscriptionParameters/Primary/MobilityRestrictions/<X>/BSList/<X>

WiMAXSupp/Operator/<X>/SubscriptionParameters/Primary/MobilityRestrictions/<X>/BSList/<X>/BS List of BSs where this mobility restriction applies can be represented by above three nodes.

Further Examples

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), Blue-Tooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

For ease of clarity, the following table provides a survey of the abbreviations used in the above description. It is to be noted that an "s" following an abbreviation represents the plural of that abbreviation, e.g. "UEs" represents "user equipments".

3GPP 3rd generation partnership project
TR/TS Technical report/technical specification
UE User equipment
CS Circuit switched
PS Packet switched
UL Uplink
DL Downlink
CAPL Contractual Agreement Preference List
DM Device Management
H-NSP Home NSP
MO Management Object
NAP Network Access Provider
NSP Network Service Provider
OMA Open Mobile Alliance
RAPL Roaming Agreement Preference List
V-NSP Visited NSP

The invention claimed is:

1. A method, comprising:
at least one of transmitting and receiving, after a network entry authentication procedure, between an access network gateway entity and one of a terminal and a serving entity, generated terminal mobility restriction information in the form of at least one text information element comprised in an authentication notification message, wherein at least one of the following applies:
the at least one text information element is constituted by a type-length-value information element;
the at least one type-length-value information element comprises sub information elements relating to at least one of a restriction type, a list of allowed base stations, a list of prohibited base stations, and an allowed location of the terminal; and
the authentication notification message is constituted by a extensible authentication protocol notification request message.

2. The method according to claim 1, wherein, if the transmitting or receiving is performed between an access network gateway entity and the serving entity, at least one of the following applies:
the serving entity is situated in one of a home connectivity service network and a local visited connectivity service network;
the authentication notification message is carried by one of a remote authentication dial-in user service request and a diameter request, both relating to an access, authorization, and accounting protocol; and
the authentication notification message is carried across an R3 interface between the access network gateway entity and the serving entity.

3. An apparatus, comprising:
at least one of a transmitter configured to transmit and a receiver configured to receive, after a network entry authentication procedure, between an access network gateway entity and one of a terminal and a serving entity, generated terminal mobility restriction information in the form of at least one text information element comprised in an authentication notification message, wherein at least one of the following applies:
the at least one text information element is constituted by a type-length-value information element;
the at least one type-length-value information element comprises sub information elements relating to at least one of a restriction type, a list of allowed base stations, a list of prohibited base stations, and an allowed location of the terminal; and
the authentication notification message is constituted by a extensible authentication protocol notification request message.

4. The apparatus according to claim 3, further comprising a generator configured to generate the authentication notification message comprising the terminal mobility restriction information in the form of the at least one text information element.

5. The apparatus according to claim 3, wherein, if at least one of the transmitter and the receiver is comprised in an access network gateway entity or the serving entity, at least one of the following applies:
the serving entity is situated in one of a home connectivity service network and a local visited connectivity service network;
the authentication notification message is carried by one of a remote authentication dial-in user service request and a diameter request, both relating to an access, authorization, and accounting protocol; and
the authentication notification message is carried across an R3 interface between the access network gateway entity and the serving entity.

6. A non-transitory computer readable storage medium including computer program code which when executed by at least one processor causes operations data structure, comprising:
at least one of transmitting and receiving, after a network entry authentication procedure, between an access network gateway entity and one of a terminal and a serving entity, generated terminal mobility restriction information in the form of at least one text information element comprised in an authentication notification message, the at least one text information element constituting terminal mobility restriction information, wherein at least one of the following applies:

the at least one text information element is constituted by a type-length-value information element;

the at least one type-length-value information element comprises sub information elements relating to at least one of a restriction type, a list of allowed base stations, a list of prohibited base stations, and an allowed location of the terminal; and the authentication notification message is constituted by a extensible authentication protocol notification request message.

\* \* \* \* \*